United States Patent
Macauley et al.

(10) Patent No.: US 11,206,440 B1
(45) Date of Patent: Dec. 21, 2021

(54) CLOUD INFRASTRUCTURE SUPPORTING DELIVERANCE OF CUSTOMIZED TV CHANNELS BY VIDEO SERVICES

(71) Applicant: Harmonic, Inc., San Jose, CA (US)

(72) Inventors: Moore Macauley, San Jose, CA (US); Gilles Devictor, San Jose, CA (US); Jeremy C. Rosenberg, Huntingdon Valley, PA (US)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 16/551,444

(22) Filed: Aug. 26, 2019

Related U.S. Application Data

(60) Provisional application No. 62/722,939, filed on Aug. 26, 2018.

(51) Int. Cl.
*H04N 21/2668* (2011.01)
*H04N 21/2343* (2011.01)
*H04N 21/2665* (2011.01)

(52) U.S. Cl.
CPC ... *H04N 21/2668* (2013.01); *H04N 21/23439* (2013.01); *H04N 21/2665* (2013.01)

(58) Field of Classification Search
CPC ......... H04N 21/2668; H04N 21/23439; H04N 21/2665
See application file for complete search history.

(56) References Cited

U.S. PATENT DOCUMENTS

| | | | |
|---|---|---|---|
| 5,594,507 A * | 1/1997 | Hoarty | G06F 3/04815 348/584 |
| 10,498,795 B2 * | 12/2019 | Srinivasan | H04L 65/80 |
| 2009/0022165 A1 * | 1/2009 | Candelore | H04N 21/23608 370/400 |
| 2016/0127440 A1 * | 5/2016 | Gordon | H04N 21/23439 709/219 |
| 2017/0064400 A1 * | 3/2017 | Riegel | H04N 21/2743 |
| 2017/0171264 A1 * | 6/2017 | Salomons | H04L 65/4069 |
| 2017/0332114 A1 * | 11/2017 | Turgut | H04N 21/812 |
| 2019/0342588 A1 * | 11/2019 | Milford | H04N 21/2187 |
| 2019/0364319 A1 * | 11/2019 | Milford | H04N 21/26258 |

* cited by examiner

*Primary Examiner* — John R Schnurr
(74) *Attorney, Agent, or Firm* — Brokaw Patent Law PC; Christopher J. Brokaw

(57) ABSTRACT

Creating a customized channel of content. A cloud infrastructure receives digital content, such as television show, advertisement, and the like, transmitted over an Internet Protocol (IP) network from a local broadcaster or channel owner. A plurality of formatted versions of the digital content is stored in a content repository in the cloud infrastructure. Each of the plurality of formatted versions differs from the others based on one or more of: an encoded bit rate, resolution, and frame rate; each of the plurality of formatted versions are aligned at a same fragment boundary. A manifest manipulator, deployed in the cloud infrastructure, creates the customized channel by selecting a particular sequence of fragments stored in the content repository and transmitting the particular sequence of fragments on the customized channel. The customized channel may be transmitted via a plurality of different propagation mediums.

20 Claims, 8 Drawing Sheets

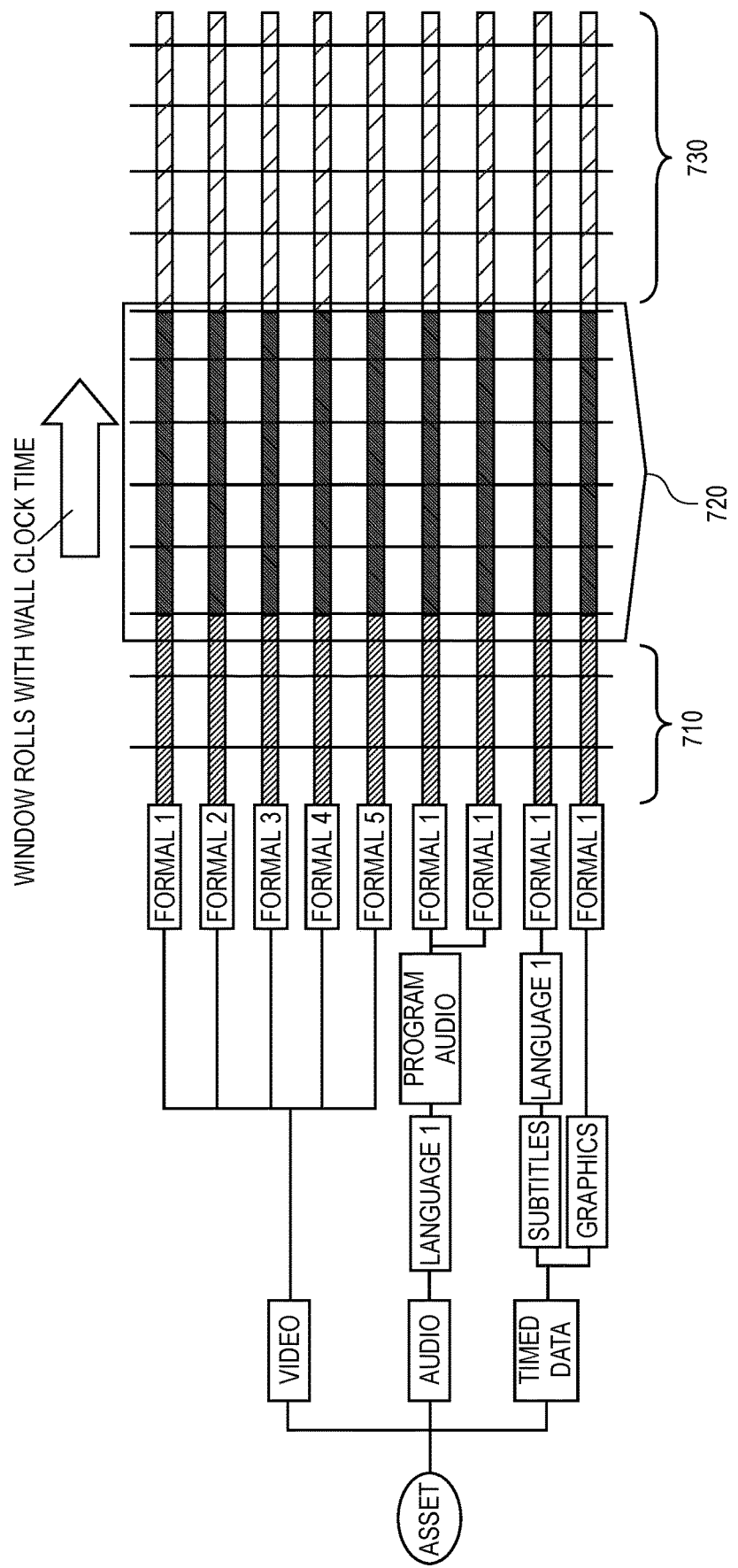

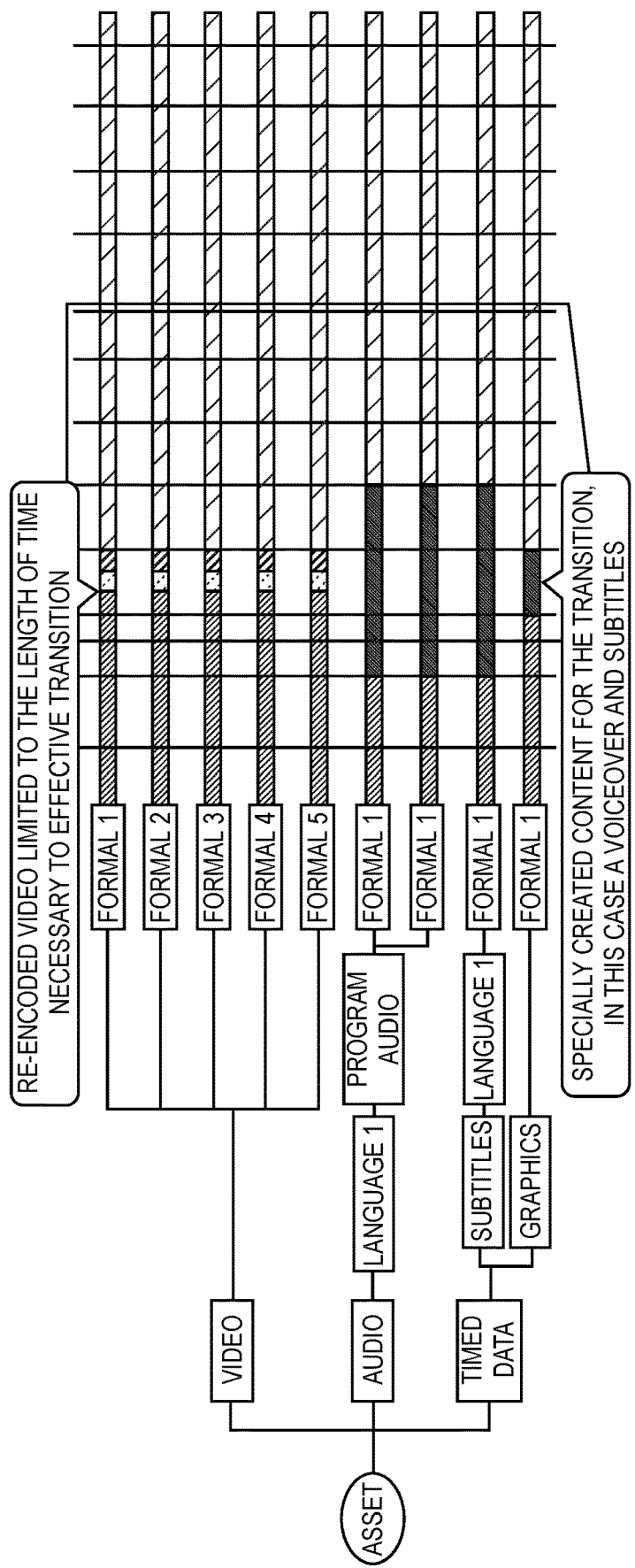

CLOUD INFRASTRUCTURE SUPPORTING DELIVERANCE OF CUSTOMIZED TV CHANNELS BY VIDEO SERVICES

CLAIM OF PRIORITY

The present application claims priority to U.S. Provisional Patent Application No. 62/722,939, entitled 'Approaches for Video Services to Deliver Customized TV Channels Using a Cloud Infrastructure,' invented by Gilles Devictor and Moore Macauley, filed on Aug. 26, 2018, the entire disclosure of which is hereby incorporated by reference in its entirety for all purposes as if fully set forth herein.

FIELD OF THE INVENTION

Embodiments of the invention generally relate to an infrastructure for creating customized television channels.

BACKGROUND

A television (TV) Channel Operator often desires to combine content originating from multiple sources, such as In-House Studio sources, Live Events sources, and Third Party sources (such as syndicated shows and the like). Traditionally, a TV Channel Operator stores and processes all content to be shown on a TV channel in a linear fashion on its premises.

Often, a TV Channel Operator may wish to create content for a TV channel that is customized in some aspect for a particular segment of its viewing audience. Each customization of a TV channel would require the creation of a new linear workflow, which in turn would require additional investments by the TV Channel Operator in infrastructure. For example, such additional infrastructure investments might include playout, encoders, splicers, and other components to support each new linear workflow.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 7 is an illustration of a manifest manipulator stitching together three digital assets according to an embodiment of the invention; and FIG. 8 is an illustration of a manifest manipulator creating a voice over in a channel by only placing the audio tracks of an asset according to an embodiment of the invention.

DETAILED DESCRIPTION OF THE INVENTION

Approaches for the creation of one or more customized channels are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

It is observed by the inventors that the current systems and architecture for the creation of customized television channels is uneconomical, unwieldy, and ill-equipped to scale as demand requires. Advantageously, embodiments of the invention would allow entities, such as a television (TV) channel operator, to leverage a cloud infrastructure to create one or more customized television channels. Such an embodiment enables the creation of one or more customized channels without the traditional investment in and deployment of the physical hardware, software, and equipment to do so.

The customized channels created by embodiments herein may correspond to customized television (TV) channels, but are not limited to channels that are consumed using a traditional television set. Indeed, the customized channels created by embodiments may be distributed and consumed using a variety of different mediums and mechanisms; the customized channels of an embodiment may correspond to a wide variety of streaming content channels delivered to devices capable of consuming content delivered over a packet based network.

Functional Overview

Figure 1:
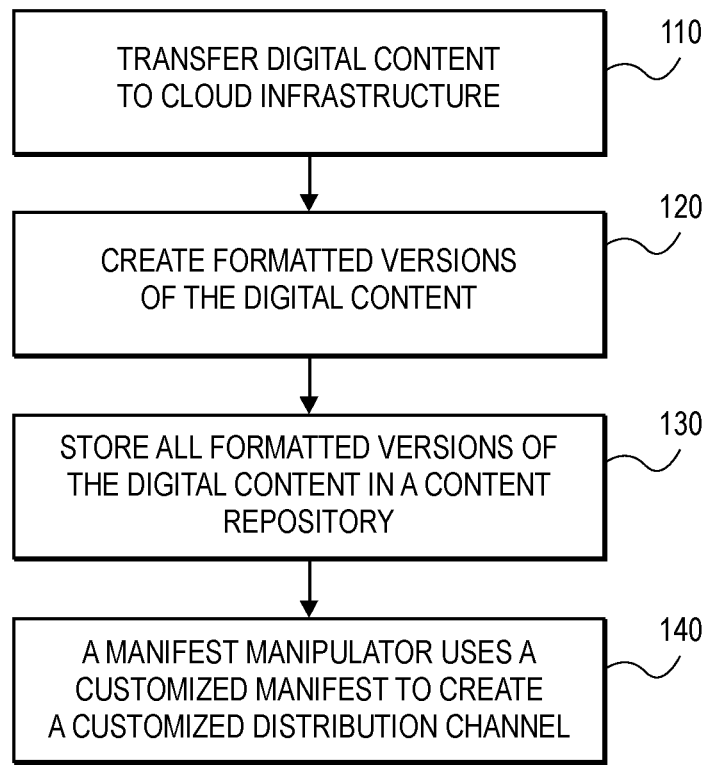
FIG. 1 is a flowchart of the steps in creation of one or more customized television channels in accordance with an embodiment of the invention.

Approaches shall be discussed herein which enable a party, such as a content right owner or a television (TV) channel operator, to create customized channels, such as but not limited to a customized TV channel, using new systems and approaches. FIG. 1 is a flowchart of the creation of one or more customized channels in accordance with an embodiment of the invention. Note that the sequence of steps illustrated by FIG. 1 is illustrative of but one embodiment, as other embodiments might perform certain steps in parallel or in a different order. For example, as explained in greater detail below, certain implementations of an embodiment may perform step 120 prior to performing step 110.

In step 110, digital content is transferred to a cloud infrastructure by a party, such as a content right owner or a television channel operator. The transfer of the digital content to the one or more content repositories may be accomplished using an IP protocol to send the digital content either in a compressed form or as baseband over IP. Note that each individual unit of digital content (such as a program, advertising, and the like) being transferred in this fashion may undergo processing in the cloud infrastructure such that the digital content will be pre-compressed, formatted (in accordance with a particular resolution, bitrate, and frame rate), and fragmented before being stored in a content repository within the cloud infrastructure. Certain embodiments, discussed below, may perform some processing of the digital content prior to it being transferred to the cloud infrastructure.

In step 120, any formatted versions of the digital content that may be required are created. Each formatted version of digital content may have a different resolution, frame rate, bitrate, and so on. If multiple formatted versions of digital content are created, then each of the multiple formatted versions of the same digital content are aligned at a fragment boundary to allow for downstream manipulation. The creation of the multiple formatted versions of digital content may happen in real time (as would be the case for live content) or offline. This "pre-processing" may be done in the cloud or on infrastructure operated by the content owner.

In step 130, all formatted versions of the digital content are stored in one or more content repositories maintained by the cloud infrastructure.

In step 140, a manifest manipulator creates a customized distribution channel by assembling versions of the digital content stored in a content repository. To do so, the manifest manipulator employs a customized manifest which describes a schedule of fragments for use with respect to a distribution channel. As broadly used herein, a fragment is a unit, or a portion of a unit, of a formatted version of digital content stored in the one or more content repositories. Use of the customized manifest allows for a custom mix of the available content stored in the content repositories to be incorporated into a customized distribution channel.

Customization of a distribution channel may be performed with respect to many factors, such as on a per region basis, a per distributor basis, or even an end-customer specific basis. For a linear distribution channel (such as a channel distributed over the air, via satellite, via cable, and so on), the fragments may be stitched together downstream of the manifest manipulator using the customized manifest to decide which fragments from which content to insert in the linear channel. Content can also be delivered as an Adaptive Bitrate (ABR) channel using the customized manifest by embodiments.

As multiple formatted versions of the same digital content are aligned at a fragment boundary, customization of a distribution channel may be performed by selecting an appropriate or desired formatted version of the next fragment in the distribution channel. The selection of the appropriate or desired next fragment in the distribution channel may be performed, at least in part, by consultation with the customized manifest. The substitution of the appropriate or desired formatted version of the next fragment in the distribution channel allows for an appropriate or desired macroblock level sub frame substitution to be performed, which has particular utility in graphics substitution. The substitution of the appropriate or desired formatted version of the next fragment in the distribution channel also allows for a packet identifier (PID) level substitution to be performed for just the audio data or just the video data associated with a portion of the digital content carried by the distribution channel.

System Overview

Figure 2:
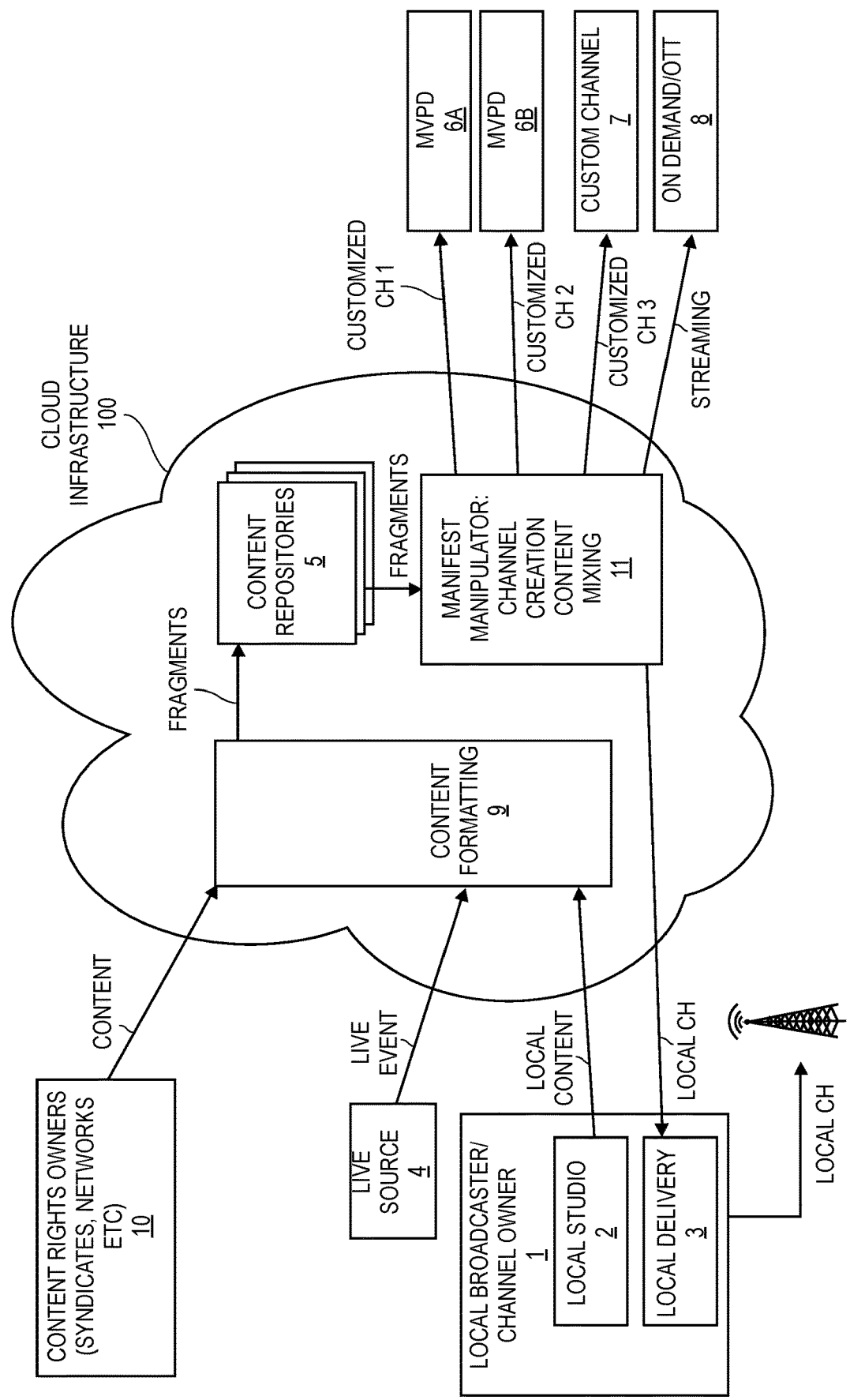
FIG. 2 is an illustration of an architecture for channel customization with content formatted using a cloud infrastructure in accordance with an embodiment of the invention.

FIG. 2 is an illustration of channel customization with content formatted using a cloud infrastructure in accordance with an embodiment of the invention. FIG. 2 depicts local broadcaster or channel owner 1, which broadly represents any entity capable of creating digital content, such as digital content created in a local studio 2, captured at a live source 4 (such as a live concert or other live event), or obtained in some other fashion.

Figure 4:
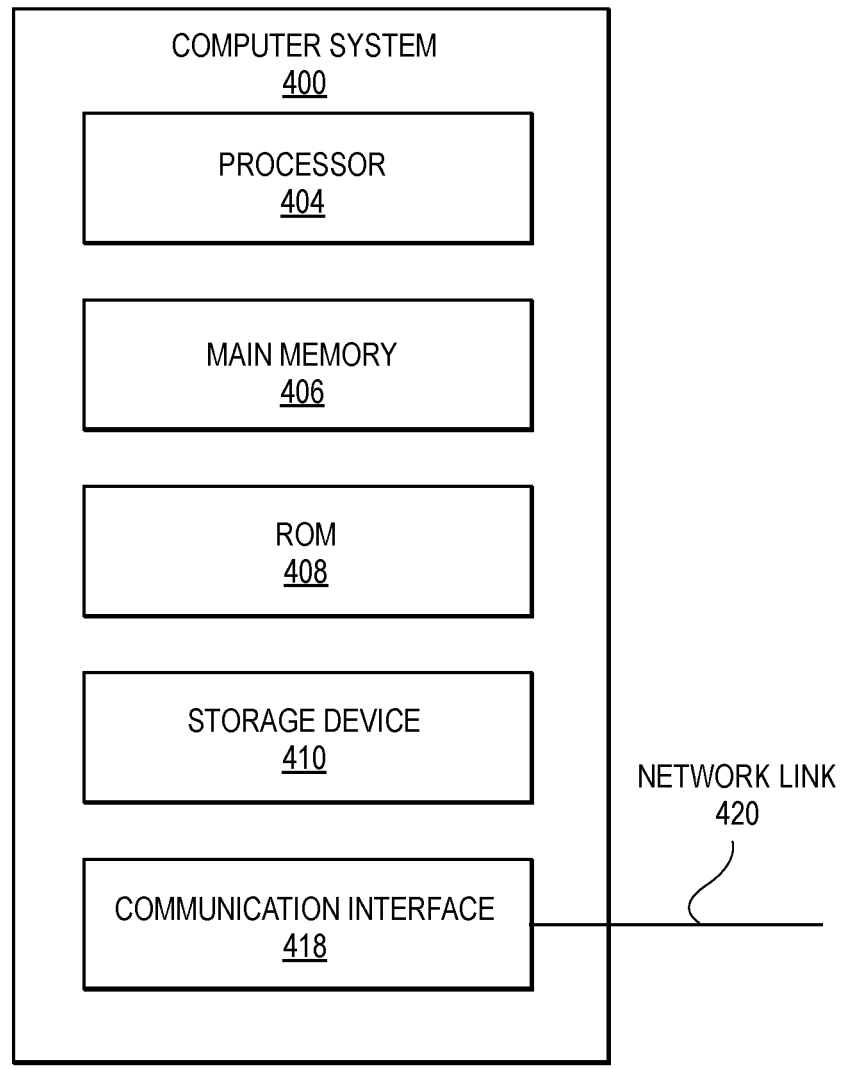
FIG. 4 is a block diagram that illustrates a computer system upon which a computerized device forming a portion of the cloud infrastructure of an embodiment of the invention may be implemented.

Local broadcaster or channel owner 1 may upload digital content to Content Formatting Device 9 located in cloud infrastructure 100. Cloud infrastructure 100 broadly represents a computerized infrastructure comprising one or more computerized devices accessible over a computer network, such as the Internet. FIG. 4, discussed in greater detail below, depicts the physical hardware which may embody one or more of the computerized devices constituting cloud infrastructure 100. Content Formatting Device 9, as broadly used herein, represents one or more computerized devices responsible for formatting digital content. The formatting performed by Content Formatting Device 9 may involve editing, encoding, and/or segmenting.

In creating a customized channel, local broadcaster or channel owner 1 may combine digital content of their own creation with content originating from other sources. A non-limiting, illustrative example of another source from which local broadcaster or channel owner 1 may obtain content for use in their customized channel is depicted in FIG. 2 as content right owners 10. Content right owners 10, as broadly used herein, represents any third party content source, such as but not limited to content syndicates, movie studios, TV networks, and the like.

After formatting digital content, Content Formatting Device 9 may cause fragments of the formatted digital content to be stored in one or more content repositories 5 maintained by cloud infrastructure 100.

Fragments stored in one or more content repositories 5 may be retrieved and assembled by manifest manipulator 11 to create a customized distribution channel (or simply a customized channel). Manifest manipulator 11 may assemble a customized channel using a variety of methods, such as without limitation: manifest manipulation, content splicing, and stitching.

Embodiments enable local broadcaster or channel owner 1 to generate customized channels that can be used by multichannel video programming distributor (MPVD), which is a service provider that delivers a wide variety of TV channels that are locally or directly streamed to customers. Examples of a MPVD include Cable TV, satellite TV, and a telecommunications company. As shown in FIG. 2, MVPD 6A may represent a Cable TV customized channel, MVPD 6B may represent a satellite TV customized channel, Custom channel 7 may represent a different type of customized channel, and On-Demand/Over-The-Top (OTT) customized channel 8 may represent a channel that is streaming over an Internet Protocol (IP) network to a requesting computer system.

In an embodiment, manifest manipulator 11 may also provide a local channel to local broadcaster or channel owner 1 for local delivery 3 via existing delivery infrastructure.

A customized channel produced by an embodiment may include a different mixture of programs depending on the final delivery mechanism and content rights, a desired set of included personal/targeted advertising, and/or other factors.

Figure 3:
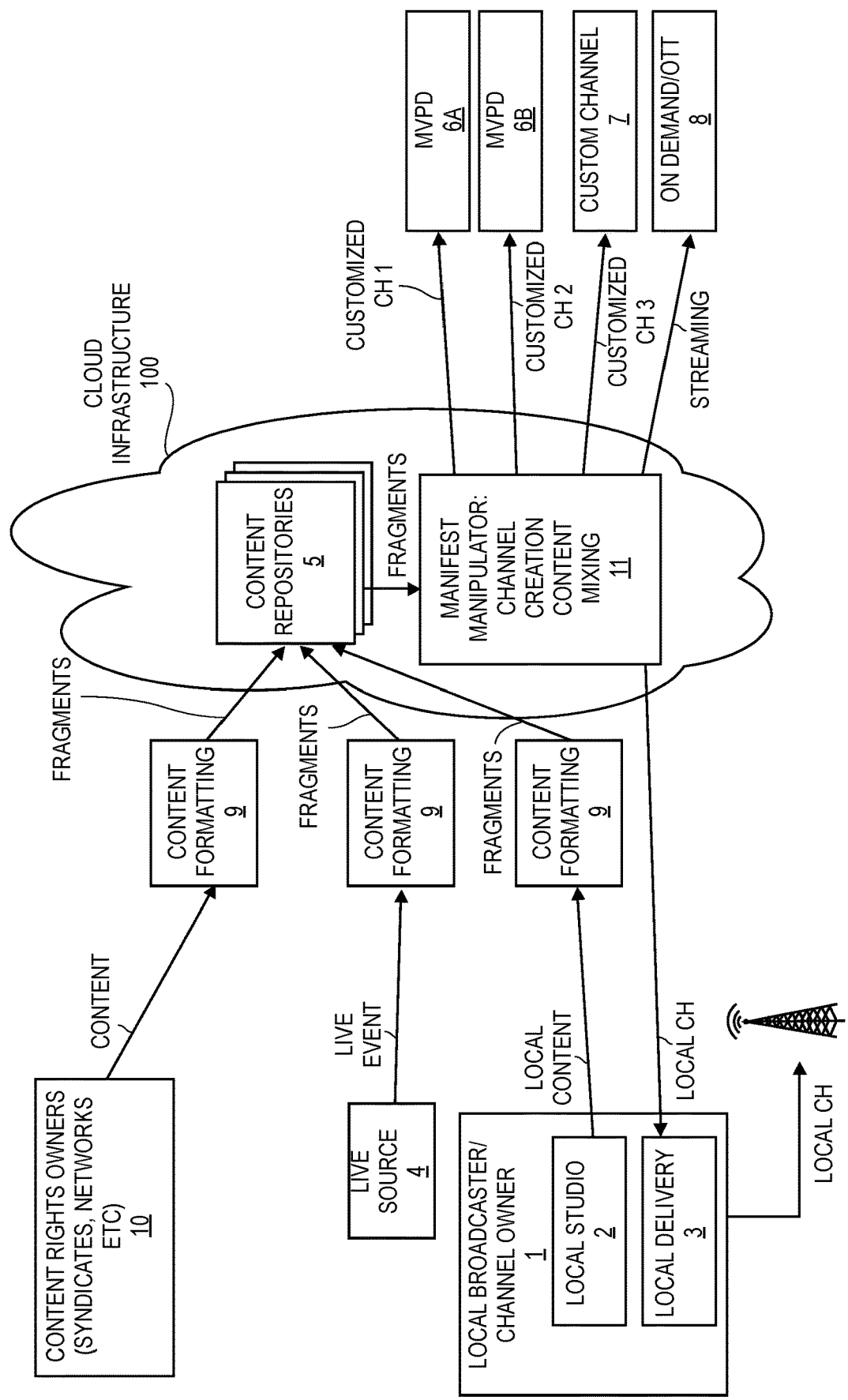
FIG. 3 is an illustration of an architecture for channel customization with content formatted prior to being transmitted to a cloud infrastructure in accordance with an embodiment of the invention.

As previously discussed, in certain embodiments, local broadcaster or channel owner 1 may perform certain formatting of digital content prior to transmittal to cloud infrastructure 100. To illustrate such an embodiment, consider FIG. 3, which is an illustration of architecture for channel customization with content formatted prior to being transmitted to a cloud infrastructure in accordance with an embodiment of the invention. As shown in FIG. 3, local broadcaster or channel owner 1 may format his or her content using a Content Formatting Device 9 locally accessible to the local broadcaster or channel owner 1 (i.e. Content Formatting Device 9 is not present within cloud infrastructure 100 as depicted in FIG. 3), and thereafter directly upload the formatted content to a content repository 5 of cloud infrastructure 100. Local broadcaster or channel owner 1 may then combine that formatted content with content originating from other sources (such as a content repository associated with content right owners 10) to generate a customized channels.

In another embodiment of the invention, local broadcaster or channel owner 1 may only combine content originating from other sources (such as a content repository associated with content right owners 10) to generate customized channels that can be used by a MPVD.

In another embodiment, local broadcaster or channel owner 1 may combine content originating from multiple sources (such as a content repository coming from content syndicates, movie studio, TV networks, or a content repository associated with content right owners 10) to generate customized channels to be delivered to customers using an Over-the-Top (OTT) service top. In such an embodiment, manifest manipulator 11 may customize the delivery manifest on a variety of different ways, such as on a per distribution channel basis, on a per region basis, or on a per individual end-customer basis.

In some embodiments, content rights owner 10, or his proxy, may only upload one version of his or her content, most likely in a Mezzanine High Bitrate format. All the preprocessing (including creation of the variant formats of the content) will then take place in, and by performed by, cloud infrastructure 100 and therefore, offsite from the content right owner 10 or his proxy.

On the other hand, in some embodiments, content rights owner 10, or his proxy may upload multiple versions of his or her content to the repositories associated with content rights owner 10. In this embodiment, certain preprocessing on the content rights owner 10 content is performed outside of cloud infrastructure 100. For example, the content rights owner 10 may desire to create certain formats of his content and/or different MPAA rating versions for his content. In such a case, all the versions of the formatted digital content will still need to be fragmented and aligned together within cloud infrastructure 100. Content rights owner 10 may still create additional versions of his or her content within cloud infrastructure 100 (i.e., offsite from the content right owner 10 or his proxy), which may be subsequently stored within one or more content repositories 5.

Implementing Hardware

In an embodiment, a computerized device constituting a portion of cloud infrastructure 100 may be implemented on computer system 400 depicted in the block diagram of FIG. 4. Additionally, any component depicted in either FIG. 2 or 3, such as local broadcaster or channel owner 1, local studio 2, local delivery 3, live source 4, content right owner 10, content formatting device 9, may be implemented on or associated with at least one computer system, such as that depicted in FIG. 4. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random-access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in storing instructions which may be provided to processor 404 for execution. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

Illustrative Example

Figure 5:
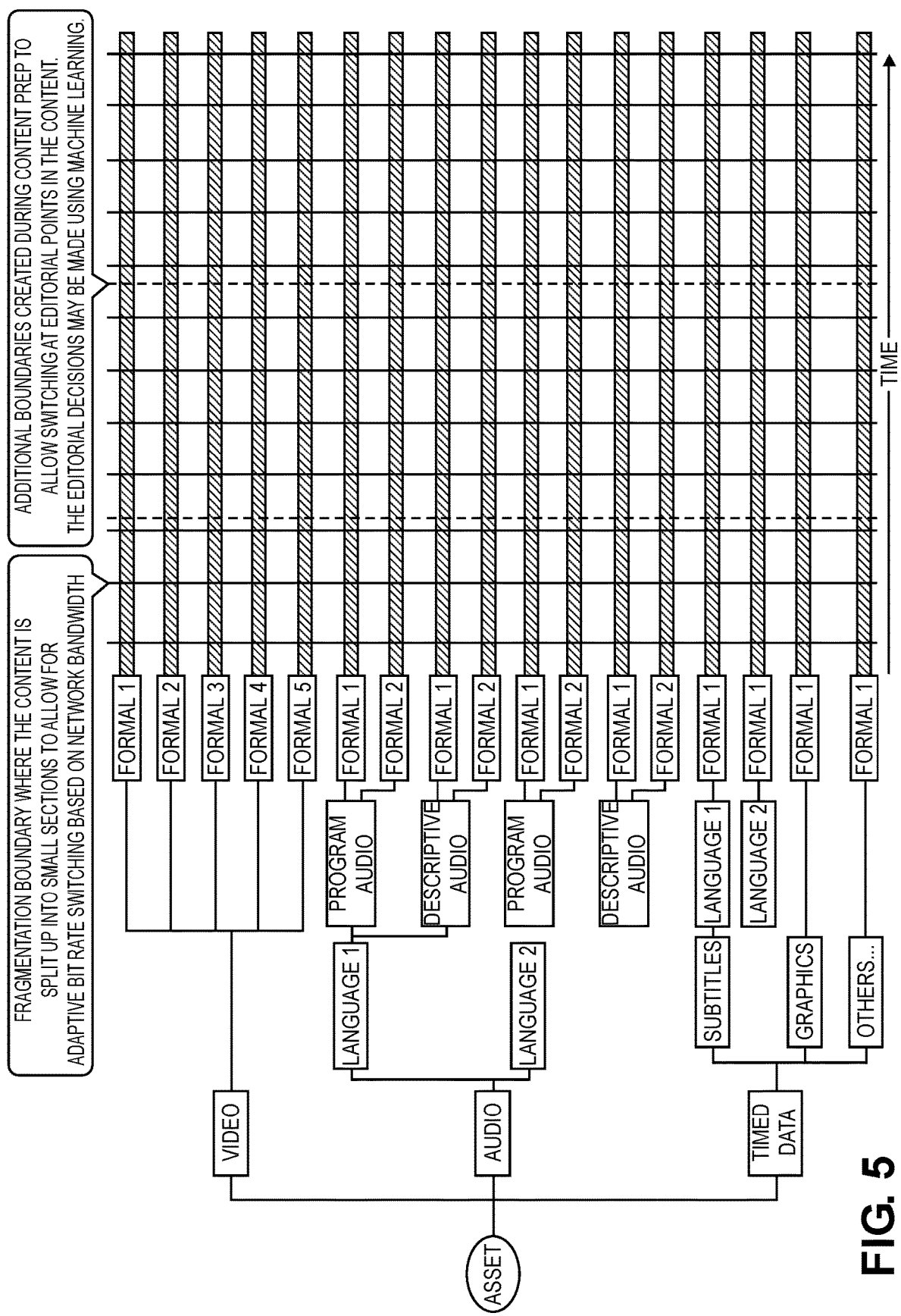
FIG. 5 is an illustration of how a digital asset is formatted for storage and delivery according to an embodiment of the invention.

Non-limiting, illustrative embodiments of the invention shall be described below with reference to FIGS. 5-8. FIG. 5 is an illustration of how a digital asset is formatted for storage and delivery according to an embodiment. Note that in FIG. 5 all of the streams are independent.

In the embodiment of FIG. 5, the manifest may be embodied or implemented as a Hyper-Text Transfer Protocol (HTTP) object or as a series of objects that describe the tracks that comprise the asset and how those tracks are fragmented. Non-limiting illustrative examples of HTTP objects that may be used as a manifest include HTTP Live Streaming objects as described in the RFC 8216 standard or Dynamic Adaptive Streaming over HTTP objects as described in the ISO/IEC 23009-1 2014 standard. Both the RFC 8216 standard and the ISO/IEC 23009-1 2014 standard define a usage model for the manifest that is used for live broadcasts.

Figure 6:
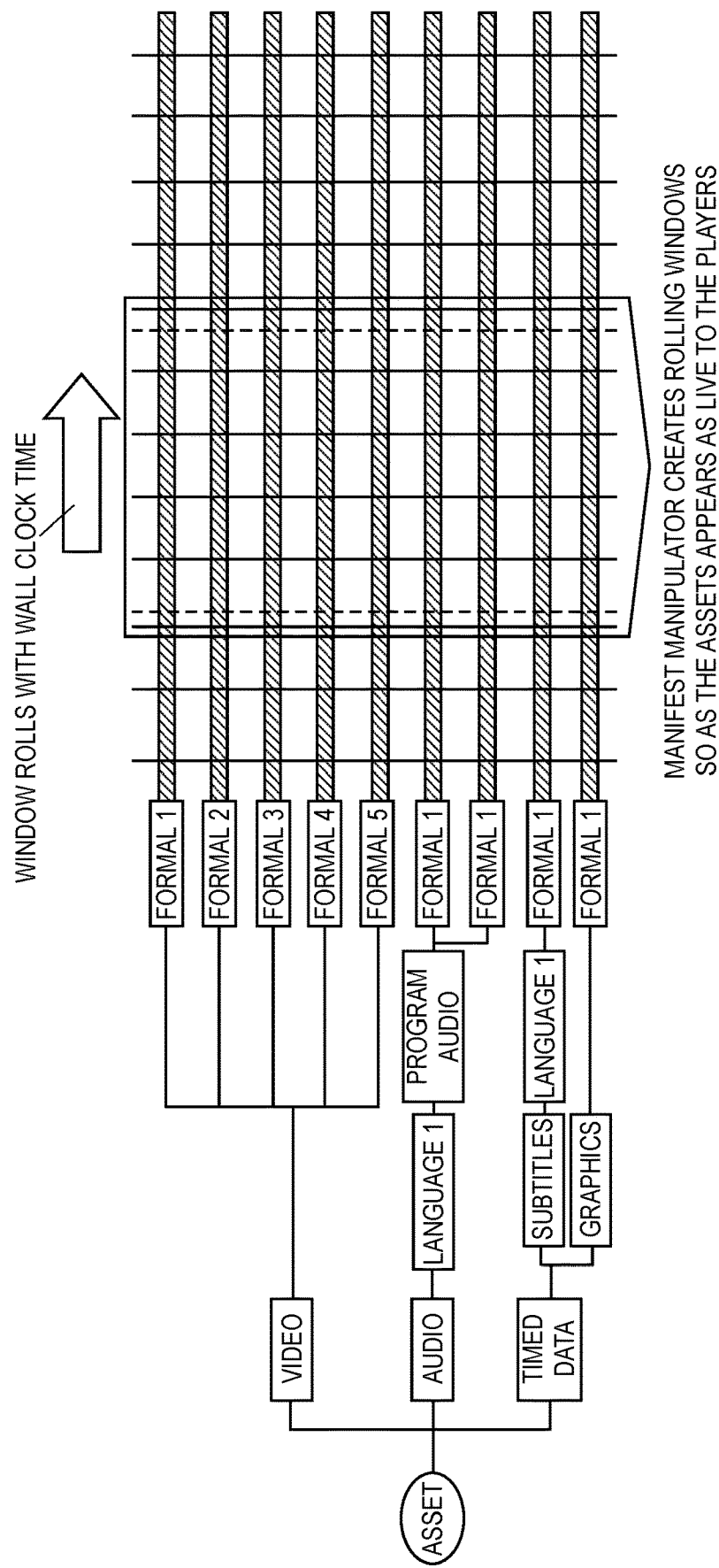
FIG. 6 is an illustration of the manifest manipulator creating time-based rolling windows so that assets appear as live to the players according to an embodiment of the invention.

Unlike the example above, a live broadcast cannot describe the asset in its entirety as it is still in the process of being created. The first job of the manifest manipulator in creating a broadcast channel is to provide time-based rolling windows into the existing asset to make it appear to the client as a live asset. FIG. 6 is an illustration of the manifest manipulator creating time-based rolling windows so that assets appear as live to the players according to an embodiment of the invention.

But live channels do not simply play a single asset, but generally play many assets over the course of a day. For this reason, the manifest manipulator needs to be able to stitch assets together so that the generated rolling window manifest appears to be coming from a camera and encoder. FIG. 7 is an illustration of a manifest manipulator stitching together three separate digital assets, each of which is prepared as before and represented by track portion 710, track portion 720, and track portion 730, according to an embodiment of the invention. When the player consumes these three assets stitched together, the viewer sees a simple cut transition between the assets. This embodiment allows the creation of a very simple broadcast channel, but one which may be insufficiently feature rich for most broadcasters today; however, once the process of manifest manipulation is grasped by market adopters, embodiments can be extended to cover other use cases.

As an example, as shown in the illustration of FIG. 8, a voice over can be achieved by only replacing the audio tracks of an asset. As an example of a more complex transition, a fade may be achieved by rendering the affect portions of the video and using the stitching technology provided by the manifest manipulator.

The branding graphics, such as a station logo, of a traditional broadcast channel cannot be efficiently achieved by the simple expedient of re-encoding the video as this would effectively necessitate the re-encoding of significant portions of the digital content. Therefore, certain embodiments of the invention include a graphics control track and carry that graphics control track along with the video content to ensure correct timing of insertion. This graphics control track is inserted by the manifest manipulator and relays commands to the player to render graphics using a technology such as but not limited to HTML.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus for creating a customized television channel, comprising:
   one or more processors; and
   one or more non-transitory computer-readable storage mediums storing one or more sequences of instructions, which when executed, cause:
      a cloud infrastructure receiving digital content transmitted over an Internet Protocol (IP) network from a local broadcaster or channel owner, wherein said cloud infrastructure comprises a plurality of computer systems in communication with each other;
      storing a plurality of formatted versions of said digital content in a content repository in said cloud infrastructure, wherein each of said plurality of formatted versions of said digital content differs from the others in said plurality based on one or more of: an encoded bit rate, resolution, and frame rate, and wherein each of said plurality of formatted versions are aligned at a same fragment boundary; and
      a manifest manipulator, of said cloud infrastructure, creating the customized television channel using a manifest by (a) selecting a particular sequence of fragments, from a plurality of fragments, stored in said content repository and (b) transmitting the particular sequence of fragments on the customized television channel, and
      wherein the plurality of fragments include at least a portion of said plurality of formatted versions of said digital content;
      at a multichannel video programming distributor (MVPD), composing an assembled version of the customized television channel using at least a subset of said particular sequence of fragments transmitted on the customized television channel downstream of the manifest manipulator using a customized manifest provided by said manifest manipulator; and
      the MVPD transmitting the assembled version of the customized television channel over a cable television distribution network or a satellite television distribution network to a cable television subscriber device.

2. The apparatus of claim 1, wherein said plurality of formatted versions of said digital content are created within said cloud infrastructure using a content formatting device.

3. The apparatus of claim 1, wherein said plurality of formatted versions of said digital content are created outside of said cloud infrastructure by said local broadcaster or channel owner, and wherein said plurality of formatted versions of said digital content are aligned at the same fragment boundary at a location within said cloud infrastructure.

4. The apparatus of claim 1, wherein said customized television channel is further propagated over at least one of: an On-Demand/Over-The-Top (OTT) service, an Adaptive Bitrate (ABR) channel, and an Internet Protocol (IP) network.

5. The apparatus of claim 1, wherein said manifest manipulator creates the customized television channel by selecting said particular sequence of fragments to customize the customized television channel based on one or more of a per region basis, a per distributor basis, and a television customer specific basis.

6. The apparatus of claim 1, wherein said customized television channel is a linear distribution channel.

7. The apparatus of claim 1, wherein selecting the particular sequence of fragments comprises:
selecting a particular macro-block level sub-frame, from among a plurality of macro-block level sub-frames, for inclusion in said particular sequence of fragments, wherein the remainder of the plurality of macro-block level sub-frames not selected for inclusion in said particular sequence of fragments are not included in said particular sequence of fragments.

8. The apparatus of claim 1, wherein selecting the particular sequence of fragments comprises:
performing packet identifier (PID) level substitution in composing said particular sequence of fragments.

9. A non-transitory computer-readable storage medium storing one or more sequences of instructions for creating a customized television channel, which when executed, cause:
a cloud infrastructure receiving digital content transmitted over an Internet Protocol (IP) network from a local broadcaster or channel owner, wherein said cloud infrastructure comprises a plurality of computer systems in communication with each other;
storing a plurality of formatted versions of said digital content in a content repository in said cloud infrastructure, wherein each of said plurality of formatted versions of said digital content differs from the others in said plurality based on one or more of: an encoded bit rate, resolution, and frame rate, and wherein each of said plurality of formatted versions are aligned at a same fragment boundary; and
a manifest manipulator, of said cloud infrastructure, creating the customized television channel using a manifest by (a) selecting a particular sequence of fragments, from a plurality of fragments, stored in said content repository and (b) transmitting the particular sequence of fragments on the customized television channel over a cable television distribution network or a satellite television distribution network, and
wherein the plurality of fragments include at least a portion of said plurality of formatted versions of said digital content;
at a multichannel video programming distributor (MVPD), composing an assembled version of the customized television channel using at least a subset of said particular sequence of fragments transmitted on the customized television channel downstream of the manifest manipulator using a customized manifest provided by said manifest manipulator; and
the MVPD transmitting the assembled version of the customized television channel over a cable television distribution network or a satellite television distribution network to a cable television subscriber device.

10. The non-transitory computer-readable storage medium of claim 9, wherein said plurality of formatted versions of said digital content are created within said cloud infrastructure using a content formatting device.

11. The non-transitory computer-readable storage medium of claim 9, wherein said plurality of formatted versions of said digital content are created outside of said cloud infrastructure by said local broadcaster or channel owner, and wherein said plurality of formatted versions of said digital content are aligned at the same fragment boundary at a location within said cloud infrastructure.

12. The non-transitory computer-readable storage medium of claim 9, wherein said customized television channel is further propagated over at least one of: an On-Demand/Over-The-Top (OTT) service, an Adaptive Bitrate (ABR) channel, and an Internet Protocol (IP) network.

13. The non-transitory computer-readable storage medium of claim 9, wherein said manifest manipulator creates the customized television channel by selecting said particular sequence of fragments to customize the customized television channel based on one or more of a per region basis, a per distributor basis, and an end-customer specific basis.

14. The non-transitory computer-readable storage medium of claim 9, wherein said customized television channel is a linear distribution channel.

15. The non-transitory computer-readable storage medium of claim 9, wherein selecting the particular sequence of fragments comprises:
selecting a particular macro-block level sub-frame, from among a plurality of macro-block level sub-frames, for inclusion in said particular sequence of fragments, wherein the remainder of the plurality of macro-block level sub-frames not selected for inclusion in said particular sequence of fragments are not included in said particular sequence of fragments.

16. The non-transitory computer-readable storage medium of claim 9, wherein selecting the particular sequence of fragments comprises:
performing packet identifier (PID) level substitution in composing said particular sequence of fragments.

17. A method for creating a customized television channel, comprising:
a cloud infrastructure receiving digital content transmitted over an Internet Protocol (IP) network from a local broadcaster or channel owner, wherein said cloud infrastructure comprises a plurality of computer systems in communication with each other;
storing a plurality of formatted versions of said digital content in a content repository in said cloud infrastructure, wherein each of said plurality of formatted versions of said digital content differs from the others in said plurality based on one or more of: an encoded bit rate, resolution, and frame rate, and wherein each of said plurality of formatted versions are aligned at a same fragment boundary; and
a manifest manipulator, of said cloud infrastructure, creating the customized television channel using a manifest by (a) selecting a particular sequence of fragments, from a plurality of fragments, stored in said content repository and (b) transmitting the particular sequence of fragments on the customized television channel over a cable television distribution network or a satellite television distribution network,
wherein the plurality of fragments include at least a portion of said plurality of formatted versions of said digital content;

at a multichannel video programming distributor (MVPD), composing an assembled version of the customized television channel using at least a subset of said particular sequence of fragments transmitted on the customized television channel downstream of the manifest manipulator using a customized manifest provided by said manifest manipulator; and the MVPD transmitting the assembled version of the customized television channel over a cable television distribution network or a satellite television distribution network to a cable television subscriber device.

18. The method of claim 17, wherein said plurality of formatted versions of said digital content are created within said cloud infrastructure using a content formatting device.

19. The method of claim 17, wherein said plurality of formatted versions of said digital content are created outside of said cloud infrastructure by said local broadcaster or channel owner, and wherein said plurality of formatted versions of said digital content are aligned at the same fragment boundary at a location within said cloud infrastructure.

20. The method of claim 17, wherein said customized television channel is further propagated over at least one of: an On-Demand/Over-The-Top (OTT) service, an Adaptive Bitrate (ABR) channel, and an Internet Protocol (IP) network.

* * * * *